(12) United States Patent
Hilton

(10) Patent No.: US 8,544,640 B1
(45) Date of Patent: Oct. 1, 2013

(54) ASSEMBLY FOR CARRYING, PROTECTING AND SUPPORTING A TABLET COMPUTER OR SIMILAR SIZED ITEM

(76) Inventor: Gregory L. Hilton, New York, NY (US)

( * ) Notice: Subject to any disclaimer, the term of this patent is extended or adjusted under 35 U.S.C. 154(b) by 0 days.

(21) Appl. No.: 13/246,822

(22) Filed: Sep. 27, 2011

Related U.S. Application Data

(63) Continuation-in-part of application No. 29/388,953, filed on Apr. 5, 2011, now Pat. No. Des. 648,530.

(51) Int. Cl.
*B65D 85/00* (2006.01)

(52) U.S. Cl.
USPC ............ 206/45.24; 206/320; 190/1; 190/115; 190/124

(58) Field of Classification Search
USPC .............. 383/10; 190/1, 124, 115; 206/45.2, 206/45.23, 45.24, 576, 320, 584
See application file for complete search history.

(56) References Cited

U.S. PATENT DOCUMENTS

| | | | | |
|---|---|---|---|---|
| 1,408,757 A | * | 3/1922 | Metzger | 206/524.3 |
| 4,162,696 A | * | 7/1979 | Sprung | 206/316.2 |
| 5,316,149 A | * | 5/1994 | Tate | 206/584 |
| 5,810,313 A | * | 9/1998 | Armstrong | 248/346.2 |
| 5,871,094 A | * | 2/1999 | Leibowitz | 206/320 |
| 5,887,777 A | | 3/1999 | Myles et al. | |
| 6,073,902 A | * | 6/2000 | Hiles | 248/346.2 |
| 6,330,992 B1 | * | 12/2001 | Swayhoover et al. | 248/230.8 |
| 7,191,926 B1 | * | 3/2007 | Costantino et al. | 224/605 |
| 2002/0125156 A1 | * | 9/2002 | King | 206/320 |
| 2004/0011616 A1 | | 1/2004 | Rasmussen | |
| 2006/0037987 A1 | * | 2/2006 | Lin | 224/646 |
| 2006/0228052 A1 | * | 10/2006 | Hess | 383/10 |
| 2007/0221522 A1 | * | 9/2007 | Yamada et al. | 206/316.2 |
| 2009/0078707 A1 | * | 3/2009 | Chen | 220/592.01 |
| 2009/0223845 A1 | * | 9/2009 | Bosma et al. | 206/320 |
| 2013/0001107 A1 | * | 1/2013 | Armstrong | 206/216 |

* cited by examiner

*Primary Examiner* — Jacob K Ackun
(74) *Attorney, Agent, or Firm* — LaMorte & Associates P.C.

(57) ABSTRACT

A carrying assembly for a tablet computer or similar object. A bag structure is provided that has an internal pocket. Padding areas exist around the internal pocket between the internal pocket and the bag structure. The padding areas are at least partially filled with padding material. The ends of a handle structure are attached to the bag structure. A fabric panel extends from the handle structure to the bag structure. The object is stored in the internal pocket. When needed, the object is removed. The bag structure is laid on one side so that the fabric panel lay flat on a surface. In this orientation, the handle structure and the bag structure combine to create a holding trough. The object is placed within the holding trough, wherein the object leans against the bag structure in an inclined orientation.

14 Claims, 4 Drawing Sheets

ASSEMBLY FOR CARRYING, PROTECTING AND SUPPORTING A TABLET COMPUTER OR SIMILAR SIZED ITEM

RELATED APPLICATIONS

This application is a continuation-in-part of patent application No. 29/388,953, filed Apr. 5, 2011 now U.S. Pat. No. D,648,530.

BACKGROUND OF THE INVENTION

1. Field of the Invention

In general, the present invention relates to devices that are used to carry tablet computers and similarly sized items. More particularly, the present invention relates to devices that can both carry tablet computers when not in use and support tablet computers when they are in use.

2. Prior Art Description

Carry bags for computers have been in existence for as long as there have been portable computers. Computer carry bags keep a computer safe and dry as the computer is carried from one place to another. The computer carry bags also help prevent a computer from being damaged if it is dropped or otherwise impacted as it is being transported.

The prior art is replete with various types and styles of computer carry bags. In fact, a carry bag probably exists for every sized portable computer that has ever been commercially marketed. Traditional computer carry bags are little more than luggage bags that are sized to receive a particular shape of portable computer. Such traditional computer carry bags typically have straps or handles that make the computer bag easier to carry. However, the bags serve no purpose once the computer is removed from the bag.

Certain specialty prior art computer carry bags have been designed that enable a portable computer to be both carried and supported by the structure of the carry bag. Such prior art specialty bags typically have a large flap that can be turned away to expose a window to the interior of the bag and the portable computer held within. Such specialty computer bags are exemplified by U.S. Patent Application Publication No. 2004/0011616 to Rasmussen, entitled Carrying Case For A Computer and U.S. Pat. No. 5,887,777 to Myles, entitled Computer Carrying Bag.

In addition to carry bags that provide access to tablet computers, there also exist many padded supports for propping up books or table computers, while the book or tablet computer is being used. Many people use such support devices to prop up electronic book displays, such as the Kindle® as they read.

Many support devices are made of rigid material, such as molded plastic. However, some support devices are made in the same manner as pillows, and are soft. Such support devices are little more than soft pillows and are exemplified by The Lap Log® manufactured by Lap Log LLC of Charleston, S.C. These support device only prop-up a book or computer and provide no structure to carry or protect a computer during transport.

A need exists for a device that can serve both as a carry bag for a tablet computer and as a support for propping up the tablet computer when it is being used. In this manner, separate carrying cases and supports do not have to be obtained. This need is met by the present invention as described and claimed below.

SUMMARY OF THE INVENTION

The present invention is an assembly for carrying and supporting an object, such as a tablet computer, laptop, smart phone, book, or magazine. A bag structure is provided that has an internal pocket. The internal pocket is accessible through a zipper or similar closure. The internal pocket is sized to receive the tablet computer or other object completely therein. Padding areas exist around the internal pocket between the internal pocket and the bag structure. The padding areas are at least partially filled with padding material. The padding material consists of a multitude of individual soft beads that enable the bag structure with its padding areas to conform into different shapes.

A handle structure is attached to the bag structure. The handle structure has a first end, a central section and a second end, wherein both the first end and the second end are affixed to the bag structure. A fabric panel extends from the handle structure to the bag structure.

The object is stored in the internal pocket for safe keeping. When needed for use, the object is removed from the internal pocket. The bag structure is laid on one side so that the fabric panel lay flat on a surface. In this orientation, the handle structure and the bag structure combine to create a raised periphery around an encircled area above the fabric panel. The object is placed within said encircled area, wherein said object leans against the bag structure in an inclined orientation for use.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention carrying assembly can be sized to carry many different items, such as books and magazines, the present invention is most beneficial for carrying electronic devices that can be damaged if impacted. The exemplary embodiment illustrated shows the assembly being used to hold a tablet computer. This embodiment is selected in order to set forth one of the best mode contemplated for the invention. The illustrated embodiment, however, is merely exemplary and should not be considered a limitation when interpreting the scope of the appended claims.

Figure 1:
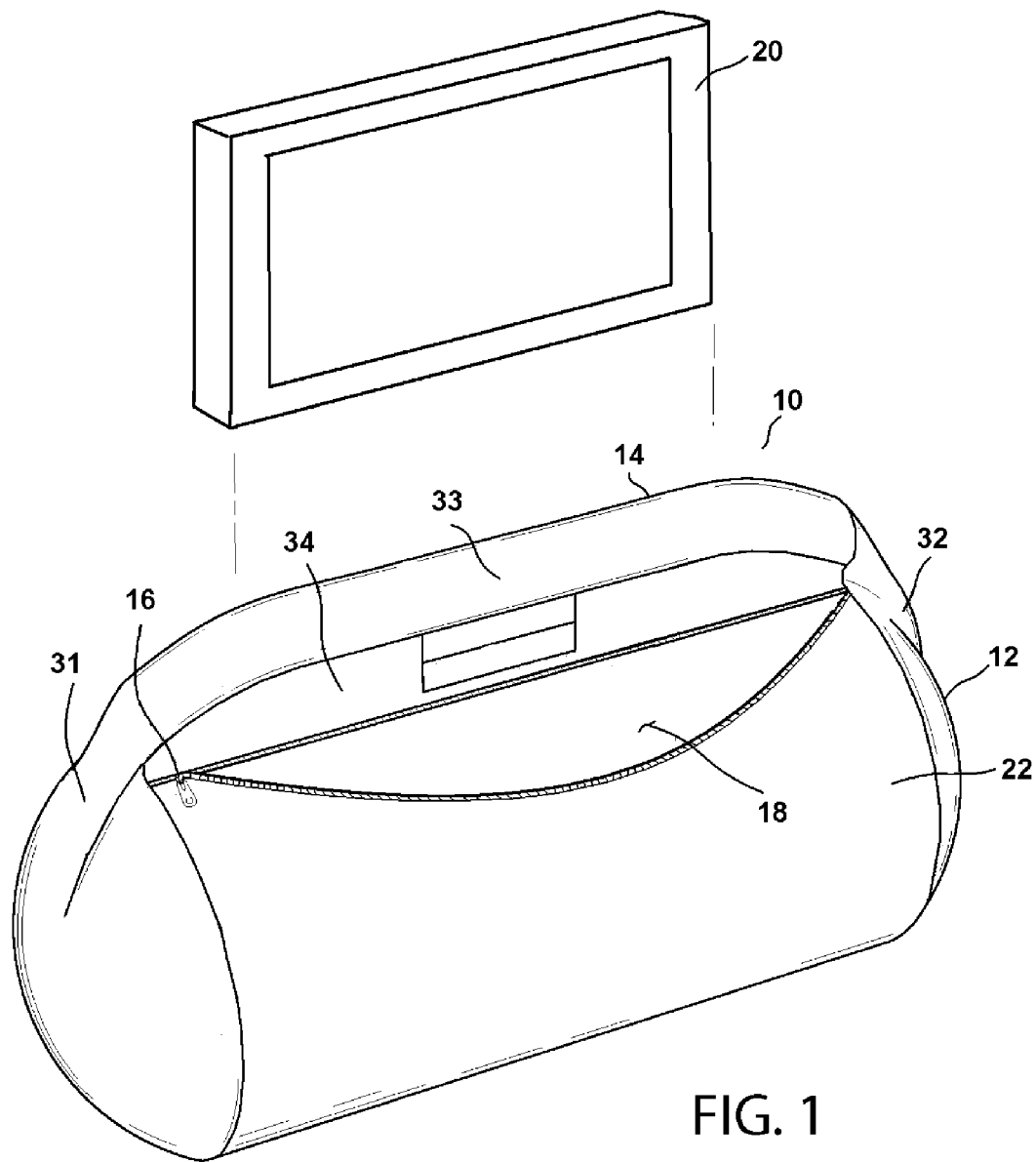
FIG. 1 is a perspective view of an exemplary embodiment of the present invention shown in conjunction with a tablet computer.
Figure 2:
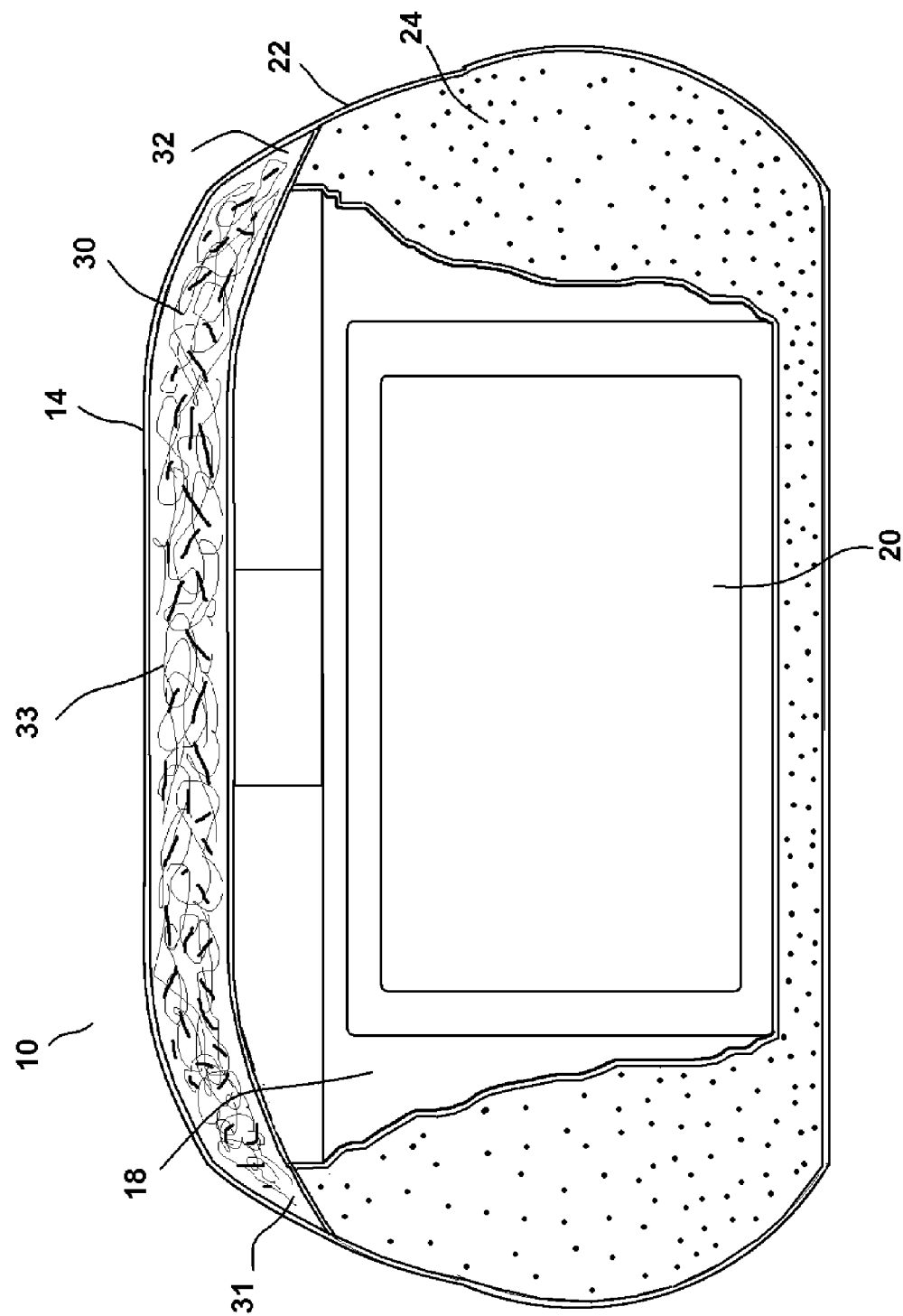
FIG. 2 is a cross-sectional view of the embodiment of FIG. 1.

Referring to FIG. 1 in conjunction with FIG. 2, an assembly 10 is shown. The assembly 10 includes a fabric bag structure 12 and a fabric handle structure 14 that extends upwardly from the top of the bag structure 12. In the shown embodiment, the bag structure 12 is generally cylindrical in shape. Such a shape is merely exemplary and it should be understood that rectangular shapes, oval shapes and many other shapes can be used. What is of importance is that the bag structure 12 is dimensioned large enough to receive an electronic device 20 within its bounds.

The bag structure 12 has a top zipper 16 that is disposed just adjacent the handle structure 14. The zipper 16 provides access to an internal pocket 18 within the bag structure 12. The internal pocket 18 is isolated within the bag structure 12 and can only be accessed through the zipper 16. The combined exterior surfaces 22 of the bag structure 12 define an area that is larger than the interior pocket 18. As a result, padded areas 24 exist between the internal pocket 18 and the exterior surfaces 22 of the bag. These padded areas 24 are filled with soft padding material 26. Although fibrous padding material such as polyester fibers can be used as padding material, the preferred padding material is soft bead padding material, such as small Styrofoam® beads. In this manner, the padding material 26 within the bag structure 12 will tend to maintain its shape when the bag structure 12 is manipulated into a particular configuration.

Although the zipper 16 provides access to the internal pocket 18, the zipper 16 does not provide access to the padded areas 24. The padded areas 24 are isolated. As a result, the padding material 26 cannot exit the bag structure 12 or enter the internal pocket 18.

The handle structure 14 also defines an internal padded region 28. However, the padding material 30 used to fill the handle structure 14 is preferably a fibrous padding material, such as polyester fibers. In this manner, the padding material 30 within the handle structure 14 will not flow out of the handle structure 14 while the handle structure 14 is being used to carry the overall assembly 10.

The handle structure 14 has two ends 31, 32 that are disposed on opposite sides of a center section 33. The two ends 31, 32 of the handle structure 14 are directly affixed to the bag structure 12. The central section 33 of the handle structure 14 loops above the bag structure 12 so as to form a handle that is easily grasped.

Connective panels 34 extend between central section 33 of the handle structure 14 and the underlying bag structure 12. The connective panels 34 are just segments of material and are not padded. A relief 36 is provided in the connective panels 34 to define an opening under the handle structure 14 for a person's fingers to pass when carrying the assembly 10.

It will be understood that in order to carry the electronic device 20, the zipper 16 is opened and the electronic device 20 is placed inside the internal pocket 18. The zipper 16 is then closed to isolate the electronic device 20 within the internal pocket 18. The electronic device 20 is surrounded on all sides by the padded areas 24 within the bag structure 12. The only area without padding is the area immediate adjacent the zipper 16. However, the handle structure 14 is positioned above the zipper 16 and provides padded protection to the area of the zipper 16. It will therefore be understood that if the assembly 10 is dropped or otherwise impacted from most any angle, significant padding is likely present between the stored electronic device 20 and the area of impact. The padding absorbs the energy of the impact and should prevent the electronic device 20 from being damaged by the forces of the impact.

Figure 3:
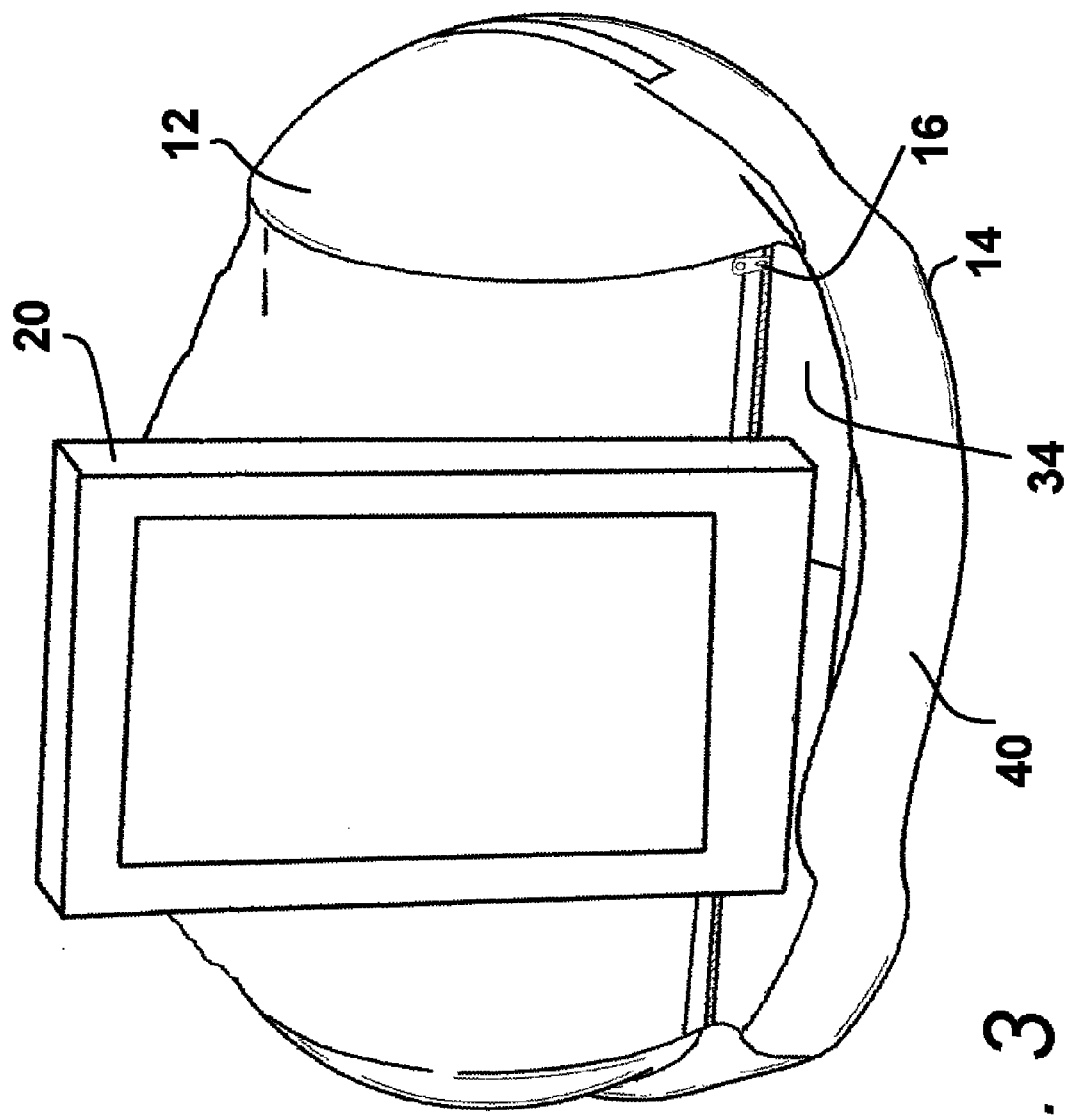
FIG. 3 is a perspective view showing the invention supporting a tablet computer.

Referring now to FIG. 3, it will be understood that the electronic device 20 can be removed from the bag structure 12 by opening the zipper 16 and removing the electronic device 20 from the internal pocket 18. Once the electronic device 20 is removed, the zipper 16 can be closed and the assembly 10 is placed on its side so that both the handle structure 14 and the bag structure 12 rest upon the surface. When the assembly 10 is positioned on its side, the connective panels 34 lay flat against the ground. The handle structure 12 combines with the bag structure 14 and the connective panels 34 to create an enclosed trough 40. The connective panels 34 form the bottom of the trough 40, while the handle structure 14 and the bag structure 12 form opposite sidewalls to the trough 40. It is preferred that the handle structure 14 be at least one inch thick and that the bag structure 12 be at least six inches thick. In this manner, the bag structure 12 can be formed into an inclined surface that leads into the holding tough 40.

When the assembly is laid on its side and the holding trough 40 is created, the bottom of the electronic device 20 can be placed into the trough 40. The weight of the electronic device 20 can then be leaned against the bulk of the bag structure 12. This retains the electronic device 20 at an inclined angle for use. The angle of the electronic device 20 can be adjusted by fluffing or flattening the padding material 26 within the bag structure 12.

The bag structure 12 has no internal or external hard surfaces. As a result, the bag structure 12 will conform to the shape of the surface upon which it is placed. For example, the bag structure can be placed on the lap of a person either sitting or laying in bed. In either scenario, the bag structure 12 can conform to the user's body and hold the electronic device 20 in an ergonomically correct position.

The bag structure 12 is also highly adept at sitting on the lap of a person having crossed legs. In this position, the trough 20 can hang along the front of the crossed leg, therein holding a book or electronic device 20 in a perfect position for use.

Figure 4:
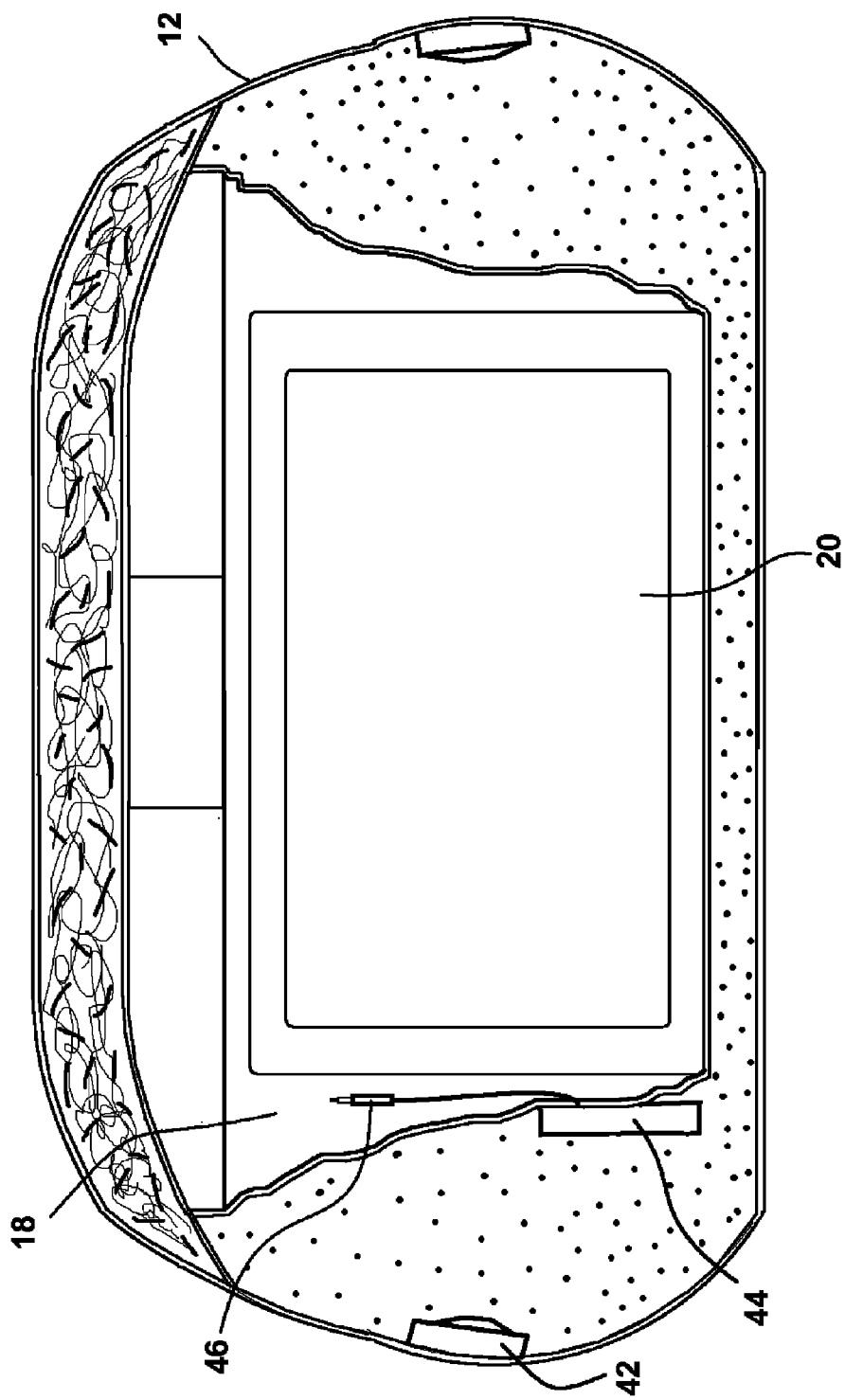
FIG. 4 is a cross-sectional view of an alternate embodiment of the present invention.

Referring now to FIG. 4, an alternate embodiment of the present invention is shown. In this embodiment, two speakers 42 are mounted to opposite ends of the bag structure 12. The speakers 42 are mounted to the fabric of the end panels. In this manner, the presence of the speakers 42 does not significantly affect the ability of the bag structure 12 to conform to different shapes.

The speakers 42 are interconnected to an audio drive unit 44. The audio drive unit 44 contains a signal amplifier and the batteries needed to drive both the speakers and the amplifier circuit. The audio drive unit 44 is affixed to the material of the internal pocket 18. In this manner, the audio drive unit 44 is protected from impact damage by the various regions of padding that surround the internal pocket 18.

The audio drive unit 44 contains plug connectors and/or wiring 46 that enables the audio drive unit 44 to connect to an electronic device.

It will therefore be understood that the present invention assembly can be used to safely carry an electronic device, while keeping that device safe from impact damage. Additionally, the assembly can be used to hold an electronic device at an inclined angle while the electronic device is being used.

It will also be understood that the embodiments of the present invention assembly that are illustrated and described is merely exemplary and that a person skilled in the art can make many variations to those embodiments. For instance, the length and width of the bag structure and handle structure can be varied to match the exterior dimensions of different tablet computers, books, or magazines. Furthermore, the degree of padding can be varied as a function of the mass of the object being carried, wherein assemblies intended to carry heavy objects have more padding. All such embodiments are intended to be included within the scope of the present invention as defined by the claims.

What is claimed is:

1. An assembly for carrying and supporting an object, said assembly comprising:

a bag structure having an internal pocket that is accessible through a zipper, wherein said internal pocket is sized to receive said object completely therein, and wherein padding areas exist around said internal pocket between said internal pocket and said bag structure;

padding material filling at least part of said padding areas, wherein said padding material consists of a multitude of individual soft beads that enable said bag structure and said padding areas to conform into different shapes;

a handle structure having a first end, a second end and a central section interposed between said first end and said second end, wherein said first end and said second end are affixed directly to said bag structure; and at least one fabric panel that extends from said central section of said handle structure to said bag structure.

2. The assembly according to claim 1, wherein said at least one fabric panel attaches to said bag structure adjacent said zipper.

3. The assembly according to claim, 1, wherein said handle structure is a flexible tube of fabric filled with soft fill material.

4. The assembly according to claim 1, further including an opening in said at least one fabric panel to enable fingers to pass under said handle structure when gripping said handle structure.

5. The assembly according to claim 1, wherein said handle structure is at least one inch thick and said bag structure is at least six inches thick.

6. The assembly according to claim 1, wherein said bas structure has two end panels and wherein at least one audio speaker is mounted to at least one of said end panels.

7. The assembly according to claim 6, further including an audio drive unit, wherein said audio drive unit is affixed to said internal pocket and is accessible within said internal pocket.

8. An assembly for supporting an object, wherein said object is selected from the group consisting of tablet computers, laptop computers, smart phones, books and magazines, said assembly comprising:

a bag structure having a side surface, wherein said bag structure is at least partially filled with padding material;

a handle structure having a first end, a second end and a central section interposed between said first end and said second end, wherein said first end and said second end are affixed directly to said bag structure; and a fabric panel, containing no padding, that extends between said central section of said handle structure and said bag structure, wherein said handle structure and said bag structure combine to create a raised periphery around an encircled area above said fabric panel when said bag structure is positioned on said side surface.

9. The apparatus according to claim 8, further including an internal pocket within said bag structure.

10. The apparatus according to claim 8, wherein said handle structure is a flexible tube of fabric filled with soft fill material.

11. An assembly for carrying and supporting an object, said assembly comprising:

a bag structure having an internal pocket that is accessible through an opening, wherein said internal pocket is sized to receive said object completely therein, and wherein padding areas exist around said internal pocket between said internal pocket and said bag structure;

padding material filling at least part of said padding areas, wherein said padding material enables said bag structure and said padding areas to conform into different shapes;

a handle structure having a first end, a central section and a second end, wherein said central section is interposed between said first end and said second end, and wherein said first end and said second end are affixed to said bag structure; and a panel extending from said handle structure to said bag structure, wherein said handle structure and said bag structure are thicker than said panel.

12. The assembly according to claim 11, wherein said opening to said internal pocket has a closable zipper.

13. The assembly according to claim 12, wherein said panel attaches to said bag structure adjacent said zipper.

14. The assembly according to claim 11, wherein said handle structure is a flexible tube of fabric filled with soft fill material.

* * * * *